Patented June 3, 1952

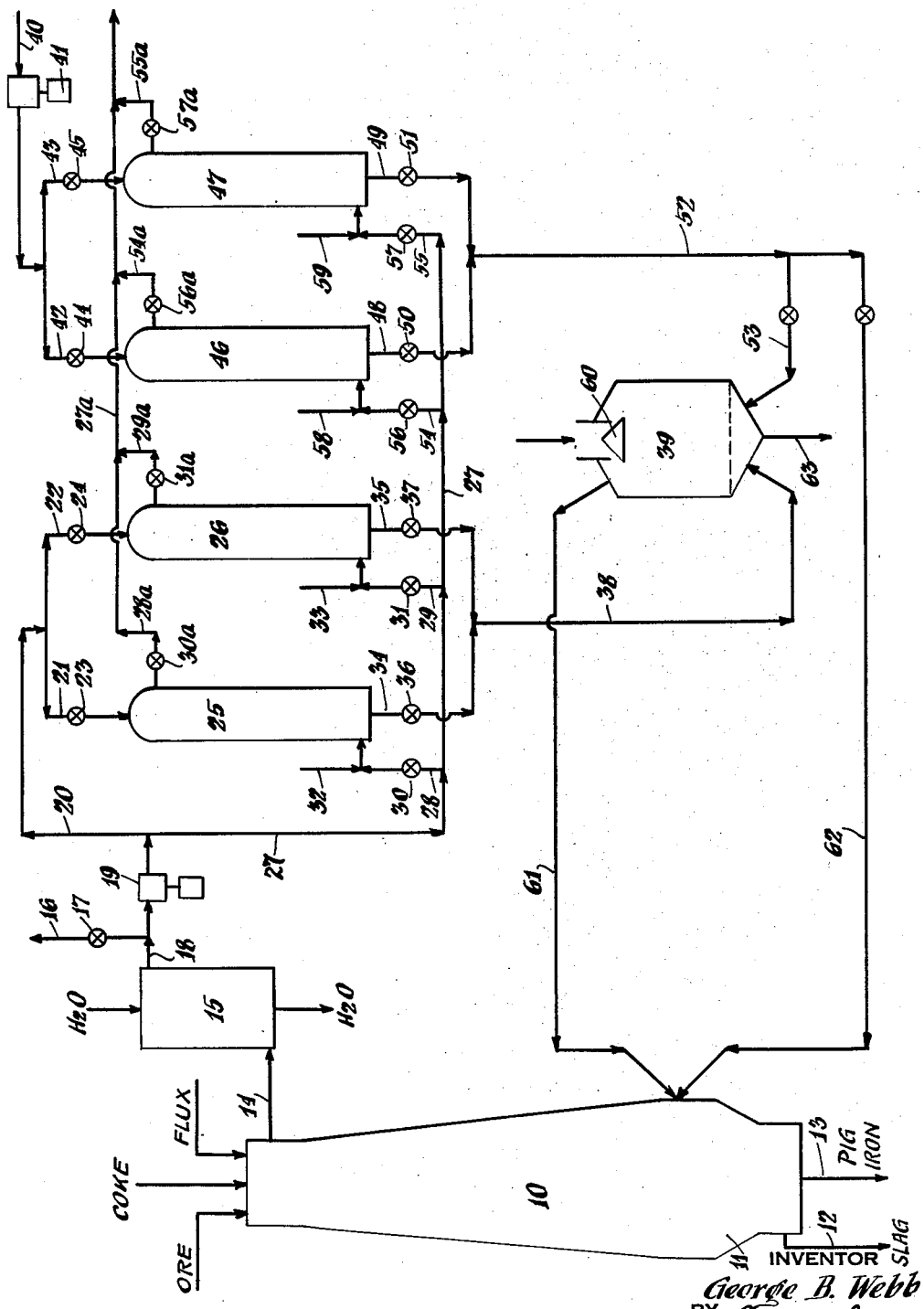

2,598,735

UNITED STATES PATENT OFFICE 2,598,735

IRON OXIDE REDUCTION

George B. Webb, Westfield, N. J., assignor to Hydrocarbon Research, Inc., New York, N. Y., a corporation of New Jersey Application July 16, 1948, Serial No. 39,087

5 Claims. (Cl. 75—42)

This invention relates to improvements in the reduction of iron oxide and more particularly to a process for the efficient utilization of oxygen in generating heat in blast furnaces and for reducing high grade fuel consumption in such furnaces.

In ordinary practice a blast furnace is operated by feeding ore, metallurgical coke and flux such as limestone into the top of the furnace while the preheated air blast is fed into the bottom to react with the coke forming hot carbon monoxide, which reduces the ore and releases the metal which gradually accumulates at the bottom of the furnace. The top or overhead gas containing large quantities of carbon monoxide in addition to carbon dioxide, nitrogen and water vapor is washed for the removal of flue dust. Part of this gas is usually burned to heat the checker-work in stoves for preheating the air blast and the remainder is utilized elsewhere as fuel in operating the plant. The conventional blast furnace process is extremely inefficient in the sense that it functions as a gas producer manufacturing gaseous fuel from high grade coke which is an expensive raw material in addition to acting as a smelter for the iron ore. Moreover, much of the gas thus formed is not consumed in ore reduction but is either discarded or merely used as fuel where cheaper forms of fuel are readily available.

Various proposals have been made for removing the carbon dioxide and water vapor from the top gas and recycling a portion of the remaining gas, composed largely of carbon monoxide, to utilize more efficiently the carbon content of the gas and decrease the rate of high grade coke consumption. These proposals have involved the use of separate absorption towers and other expensive apparatus which offset any saving realized in coke consumption.

One of the primary objects of this invention is to improve the efficiency of blast furnace operation by recycling overhead gas from which carbon dioxide has been eliminated without the use of absorption apparatus.

Another object of the invention is to effect conversion of carbon dioxide to carbon monoxide by contacting carbon with overhead gas and oxygen at an elevated temperature and to minimize the consumption of oxygen by utilizing the heating value of some of the overhead gas to attain the desired elevated temperature.

Another important object of the invention is to reduce the consumption of high grade coke in blast furnace operation by using a cheaper form of carbon to generate carbon monoxide which is fed to the furnace.

Other objects and advantages of the invention will become apparent from the following description considered in connection with the accompanying drawing which illustrates one form of the invention.

According to the present invention it has been found that substantial economies in the coke requirements of the blast furnace may be effected by contacting a portion of the overhead gas containing carbon dioxide with carbon in a generator at a sufficiently elevated temperature to reduce the carbon dioxide of the gas to carbon monoxide and at the same time introducing oxygen into the generator in sufficient amount to furnish the heat required for the endothermic reaction. Further, it has been found that if another portion of the overhead gas is burned and the sensible heat of the combustion gases utilized for preheating the portion of the gas, and preferably also the oxygen, entering the generator, a very substantial saving in oxygen is effected. When these conditions are observed, the oxygen, besides providing heat for the endothermic reduction of the carbon dioxide in the overhead gas passing through the generator, converts a relatively cheap form of carbon into carbon monoxide and thus further enriches the carbon monoxide content of the gas leaving the generator. The gaseous effluent from the generator which is rich in carbon monoxide and is at a relatively high temperature is fed to the blast furnace along with oxygen. Preferably, the oxygen is preheated by the combustion of the portion of the overhead gas which does not pass through the generator. Thus, it is seen that the overhead gas of the blast furnace is divided essentially into two portions: one is recycled to the furnace after its content of carbon monoxide has been enriched and the other is consumed to provide heat.

Substantially pure oxygen or oxygen-enriched air (usually not less than about 35% by volume of oxygen) is used both in the generator and in the blast furnace since it is advantageous to avoid the passage of substantial volumes of nitrogen through these reaction units. Oxygen in concentrated form also makes it feasible to operate the generator on a continuous basis.

The recycling of a portion of the overhead gas after enrichment in carbon monoxide in accordance with this invention decreases the coke requirement in the furnace. While the coke supplied to the furnace must meet specifications which increase its cost, the generator can operate on any cheap fuel such as char, coke fines or breeze, or coke which is unacceptable for use in the blast furnace. Accordingly, a substantial economy in the use of high grade coke in the blast furnace is accomplished.

The recycle of overhead gas by the present method is particularly economical since the oxygen required for addition to the generator is curtailed by the preheating of the gas entering the generator. Usually the gas is preheated to a temperature of at least 1300° F. before entering the generator. A sufficient amount of oxygen is then introduced to attain a reaction temperature of about 1800° F. to 2000° F. in the generator. The use of combustion heat from a portion of the overhead gas for preheating the recycle portion accounts for the economy in the consumption of oxygen.

The oxygen requirement of the generator may further be decreased by preheating the oxygen stream before it enters the generator with a part of that portion of the overhead gas which is burned to preheat the recycle portion. Similar preheating of the oxygen which is charged into the blast furnace is desirable and economic from the thermal viewpoint.

The process herein described approaches the optimum use of carbon, stoichiometrically as well as thermally, more closely than has been possible with conventional blast furnace practice, by recycling carbon monoxide and eliminating carbon dioxide in three ways. In the first place, part of the carbon dioxide is eliminated by burning a portion of the overhead gas containing carbon dioxide to preheat the recycle portion of the overhead gas and then discarding this burned portion. Secondly, the carbon dioxide of the recycle portion is reduced to carbon monoxide at high temperature by the use of oxygen and carbon, and thirdly, the remainder of the overhead gas in excess of that required for combustion or recycle is vented from the system for utilization elsewhere.

The separation and combustion of a portion of the overhead gas materially decreases the thermal load on the generator thereby decreasing the amount of oxygen required for reaction heat. Air is most economically used in the combustion of a portion of the overhead gas for preheating the recycle portion.

In accordance with the present invention, a very large proportion of the carbon monoxide used in reducing the ore is developed in a generator which utilizes relatively cheap fuel such as char, coke fines and the like. This cheap fuel is utilized in two principal ways: (1) for the relatively inexpensive high temperature reduction of the carbon dioxide in the recycle gas, and (2) in the formation of carbon monoxide directly from the oxygen introduced into the generator.

In general, according to this invention, from about 20% to 80% of the required carbon is introduced into the blast furnace and the remainder (80% to 20%) is fed to the generator. Frequently, the division is made so that 40% to 60% of the carbon enters the furnace and the rest goes to the generator. While it is desirable to supply as much carbon as possible by way of the generator, some carbon must be charged into the blast furnace to give bed porosity and to facilitate in other ways the reduction of the iron ore. In each case, the division of carbon depends on several process variables including the type of ore used, the desired bed depth and porosity in the blast furnace. The selected division of carbon between the furnace and the generator largely determines the proportions of the overhead gas which make up the recycle portion and the fuel portion. For any chosen carbon division, the proportions of overhead gas going to the recycle and fuel portions is readily estimated through heat and material balances. The estimated proportions can be tried and adjusted in a few exploratory runs in the blast furnace to find the optimum proportioning of the overhead gas for use as the recycle and fuel portions. Overhead gas in excess of these two portions which are used within the process of the invention is withdrawn and utilized elsewhere as a fuel or in any other desired manner.

The oxygen furnished to the blast furnace is in concentrated form, i. e., generally over 35% by volume. Oxygen of at least 90% by volume purity is preferred.

Referring to the drawing wherein a flow sheet is represented to illustrate one embodiment of my process, coke, ore and suitable fluxing materials are introduced into the top of blast furnace 10 and gradually descend through the furnace while undergoing reduction until molten slag and pig iron are withdrawn from the lower or crucible portion 11 through lines 12 and 13, respectively. The gaseous reactants, hereinafter more fully described, which are fed into the lower part of furnace 10, and the gaseous reaction products flow countercurrently to the descending solids and pass as the overhead gas, composed essentially of carbon monoxide, carbon dioxide and water vapor, through line 14 to wash tower 15 where a spray of water removes entrained dust and other solid or condensible impurities. Electrical precipitators, cyclones and like separators may be employed in place of or in conjunction with wash tower 15. The washed overhead gas leaves tower 15 through line 18 and is made to flow by compressor or blower 19 through two separate paths. One portion of the overhead gas flows through line 20 which has branch lines 21 and 22 provided with valves 23 and 24, respectively. This portion of the gas, which may be called the recycle gas since it is ultimately returned to furnace 10, passes alternately through stoves 25 and 26 connected to lines 21 and 22, respectively. The other portion of the overhead gas, which may be termed the fuel gas, flows through line 27 and alternately through branch lines 28 and 29 provided with valves 30 and 31, respectively, into stoves 25 and 26. Oxygen, usually in the form of air, is supplied through lines 32 and 33 to burn the fuel gas alternately entering stoves 25 and 26, respectively. Thus, during one interval, say 4 hours, the fuel gas and air enter stove 25 and raise its temperature with the heat of combustion while the recycle gas is preheated by flowing through stove 26 heated during the preceding interval. In the subsequent interval, the fuel gas is burned in stove 26 and the recycle gas is preheated in stove 25.

The flue gases resulting from the combustion of the fuel portion of the overhead gas leave stoves 25 and 26 through lines 28a and 29a provided with valves 30a and 31a, respectively, discharging into a common vent line 27a. The preheated recycle gas alternately flows from stoves 25 and 26 by way of lines 34 and 35 provided with valves 36 and 37, respectively, into line 38 which is connected to the gas generator 39.

Oxygen required in generator 39 is preferably preheated. In the illustrative flow sheet, the oxygen is preheated in a system similar to that just described for preheating the recycle gas. Oxygen is supplied by line 40 and compressor or blower 41 alternately to lines 42 and 43 which are provided with valves 44 and 45, respectively. Lines 42 and 43 are connected to stoves 46 and 47 from which preheated oxygen may emerge by way of lines 48 and 49 provided with valves 50 and 51, respectively, and pass through line 52 and valved branch 53 into generator 39.

Part of the fuel gas in line 27 alternately flows through lines 54 and 55 and valves 56 and 57 into stoves 46 and 47 wherein it is burned with air supplied by lines 58 and 59, respectively. The flue gases leave stoves 46 and 47 through lines 54a and 55a and valves 56a and 57a, respectively, and discharge into vent line 27a.

The preheated oxygen entering generator 39 through line 53 reacts exothermically with the carbon charged thereto through port 60 and thus furnishes heat to the endothermic reaction between the carbon dioxide of the recycle gas fed by line 38 and the carbon in the generator. The gases charged to the generator are proportioned so that the gaseous effluent leaving through line 61 contains very little, if any, carbon dioxide. Generally speaking, the carbon dioxide content of the generator effluent is maintained below about 10% by volume, preferably below about 5% by volume.

The recycle gas, now substantially free of carbon dioxide and enriched in the desirable carbon monoxide is passed while still at an elevated temperature through line 61 into the lower section of furnace 10 to take part in the reduction of the iron oxide. Simultaneously, part of the preheated oxygen in line 52 flows through valved branch line 62 into the lower section of furnace 10. The oxygen reacts exothermically within the furnace and thus provides heat for the endothermic reduction of iron oxide. The gaseous reactants ascend through the descending mass of ore, coke and flux while reacting and facilitating the reduction of iron oxide. As already stated, the reaction gases leave the furnace 10 through line 14 as an overhead gas containing appreciable proportions of both carbon monoxide and dioxide. This overhead gas is then treated in the manner hereinabove described. Excess overhead gas which cannot profitably be utilized with the recycle portion or the fuel portion is withdrawn through branch line 16 which is connected to line 18 and is provided with valve 17. The withdrawn gas has fuel value and may be used in power generation.

While a metallurgical grade of coke is used in the blast furnace 10, a relatively cheap carbonaceous fuel such as char or coke breeze is consumed in generator 39. The ash of the fuel which is charged through port 60 leaves generator 39 at 63.

The advantages of the present invention are more fully appreciated from the following specific example which compares the operational requirements of a blast furnace process employing the principles of the present invention with the requirements of the conventional blast furnace process. The cited gas volumes are based on standard conditions.

For the production of each ton (2000 lbs.) of pig iron, 800 lbs. of coke and the desired fluxing material are introduced along with 3500 lbs. of hematite ore (iron content about 54% by weight) into the top of the blast furnace 10 and gradually descend to the lower part 11 of the furnace. The gaseous reactants for each ton of pig iron consist of 10,330 cu. ft. of oxygen (96% by volume purity) supplied by way of line 62 and carbon monoxide-enriched recycle gas supplied by way of line 61 into the lower part 11 of the furnace to contact the descending solids and thus reduce the iron oxide in the ore. The reaction gases flow upwardly and leave the furnace 10 through line 14 as overhead gas.

The overhead gas amounting to 50,700 cu. ft. per ton of pig iron passes from the top of the blast furnace at a temperature of about 300° F. and is divided as follows: a recycle portion amounting to 12,200 cu. ft. is preheated in the stoves 25 and 26, alternately operated, before entering the generator 39; a second portion amounting to 5,250 cu. ft. is burned and the combustion products used for heating the stoves 25, 26, 46 and 47; and the remainder amounting to 33,250 cu. ft. is withdrawn from the system and utilized for power generation or other purposes.

The recycle portion of the gas preheated to a temperature of 1300° F. in the stoves enters the lower part of the generator 39 into which 635 lbs. of relatively low grade carbonaceous fuel such as char, coke fines or the like is fed for each ton of pig iron, and passes countercurrent to the carbonaceous fuel charged through port 60. Oxygen (96% by volume purity) in the amount of 5,540 cu. ft. for each ton of pig iron is also preheated to a temperature of about 1300° F. in stoves 46 and 47 by the combustion products from the second portion of the overhead gas and introduced into the generator 39. The recycle portion of the overhead gas and the oxygen contact the carbon in the generator raising the reaction temperature to about 1800–2000° F., the carbon dioxide in the recycle gas is reduced to carbon monoxide, the oxygen forms additional carbon monoxide by reaction with the free carbon, and the gas thus enriched in carbon monoxide flows from the generator by way of line 61 and enters furnace 10 at a temperature of about 1300° F. The oxygen, previously mentioned as being supplied to furnace 10, is also preheated to a temperature of about 1300° F. by combustion of the second portion of the overhead gas in the stoves 46 and 47. The pig iron and slag are tapped from the furnace at a temperature of about 2500° F.

With the conventional blast furnace process, using the same iron oxide ore of the foregoing illustrative example of the invention, each ton of pig iron produced requires a high grade coke input to the blast furnace of 1590 lbs. The reduction of the iron oxide requires for each ton of pig iron a blast of 75,700 cu. ft. of air producing an overhead gas of 103,400 cu. ft. This overhead gas is ordinarily divided into two portions, one portion amounting to 22,400 cu. ft. being used as fuel in stoves for preheating the air blast and the remaining portion of 81,000 cu. ft. being drawn off from the system for use as fuel or in any desired manner.

It will be appreciated that the process of the invention, as illustrated in the specific example, has enabled a 50% decrease in the amount of high grade coke required in the conventional operation of the blast furnace. The high grade coke requirements may be further reduced by increasing the input of low grade fuel to the generator and suitably adjusting the conditions of operation. Thus, a very substantial proportion of the fuel requirement of the furnace is obtained through the use of low grade fuel in the generator. Furthermore, it is evident from the example that the overall fuel requirements of the furnace, when operated in accordance with this invention, are substantially decreased in that a total of 1435 lbs. of carbonaceous fuel is consumed as against 1590 lbs. in conventional operation. A further advantage is that the volume of gases preheated by the stoves is much less and therefore smaller stove and blower capacities are required. The overhead gas available for fuel from the process of the invention, being deficient in nitrogen, is of substantially higher heating value than the overhead gas from the conventional blast furnace process and is suitable for use as fuel in open hearth and similar steel refining units.

It will be clear to those skilled in the art that because of the decreased quantity of carbon charged into the reducing furnace and of the oxygen-rich gas supplied thereto in place of an ordinary air blast, the present invention permits the use of reducing furnaces of decreased height. Decreased furnace height means that the porosity of the reaction bed can be lower than that customarily maintained in blast furnaces and, in turn, this means that the carbonaceous solid or coke introduced into the reducing furnace can have a lower crush resistance. Accordingly, the invention affords the opportunity not only of decreasing the consumption of coke or like carbonaceous solid but also of utilizing cokes of inferior quality (relatively low strength or crush resistance).

Various modifications of the invention will occur to those skilled in the art upon consideration of the foregoing disclosure without departing from the spirit or scope thereof. Accordingly, only such limitations should be imposed as are indicated by the appended claims.

I claim:

1. In the process of operating a shaft-type furnace to reduce iron oxide wherein a gaseous effluent from said furnace contains essentially carbon monoxide and carbon dioxide and is recycled to said furnace after treatment to decrease substantially the carbon dioxide content of said gaseous effluent, the improvement which comprises burning a portion of said gaseous effluent to preheat a second portion thereof, reacting solely the preheated portion of said gaseous effluent and oxygen of at least about 90% by volume purity with coke at a temperature of at least 1800° F. to produce a gaseous stream enriched in carbon monoxide, and passing said gaseous stream and additional oxygen of at least about 90% by volume purity through said furnace to effect reduction of iron oxide.

2. In the process of operating a blast furnace to reduce iron oxide wherein an overhead gas containing essentially carbon monoxide and carbon dioxide is recycled to said furnace after treatment to decrease substantially the carbon dioxide content of said overhead gas, the improvement which comprises burning a portion of said overhead gas to preheat a second portion thereof and oxygen of at least about 90% by volume purity to a temperature of at least 1300° F., reacting solely the preheated portion of said overhead gas and the preheated oxygen with coke at a temperature of at least 1800° F. to produce a gaseous stream enriched in carbon monoxide, and introducing said gaseous stream and additional oxygen of at least about 90% by volume purity into the lower part of said furnace to effect reduction of iron oxide.

3. In the process of operating a blast furnace to reduce iron oxide wherein an overhead gas containing essentially carbon monoxide and carbon dioxide is recycled to said furnace after treatment to decrease substantially the carbon dioxide content of said overhead gas, the improvement which comprises burning a portion of said overhead gas to preheat a second portion thereof and a gaseous stream containing at least about 90% by volume of oxygen to a temperature of at least 1300° F., reacting solely the preheated portion of said overhead gas and the preheated oxygen-containing stream with coke by upward passage through a downwardly moving bed of said coke to produce a gaseous stream enriched in carbon monoxide, and introducing the carbon monoxide-enriched stream and a second gaseous stream containing at least about 90% by volume of oxygen into the lower part of said furnace to effect reduction of iron oxide.

4. The process of claim 2 wherein the gaseous stream enriched in carbon monoxide has a carbon dioxide content below about 5% by volume.

5. The process of claim 3 wherein the second gaseous stream containing at least about 90% by volume of oxygen is preheated to a temperature of at least 1300° F. before introduction into the lower part of the blast furnace.

GEORGE B. WEBB.

REFERENCES CITED

The following references are of record in the file of this patent:

UNITED STATES PATENTS

| Number | Name | Date |
|---|---|---|
| 590,925 | Westman | Sept. 28, 1897 |
| 891,248 | Gronwall | June 23, 1908 |
| 1,010,490 | Frick | Dec. 5, 1911 |
| 1,795,829 | Brassert et al. | Mar. 10, 1931 |
| 1,803,686 | Andrews | May 5, 1931 |
| 1,842,609 | Hillhouse | Jan. 26, 1932 |
| 1,850,009 | Gronwall et al. | Mar. 15, 1932 |
| 1,984,727 | Brown | Dec. 18, 1934 |

FOREIGN PATENTS

| Number | Country | Date |
|---|---|---|
| 369,393 | Great Britain | Mar. 24, 1932 |
| 521,415 | Great Britain | May 21, 1940 |

OTHER REFERENCES

Ser. No. 360,935, Schwier (A. P. C.), published May 4, 1943.